(12) United States Patent
Alvarez Dominguez et al.

(10) Patent No.: US 10,015,676 B2
(45) Date of Patent: Jul. 3, 2018

(54) DETECTING FRAUDULENT TRAFFIC IN A TELECOMMUNICATIONS SYSTEM

(71) Applicant: Telefonaktiebolaget L M Ericsson (publ), Stockholm (SE)

(72) Inventors: Rodrigo Alvarez Dominguez, Madrid (ES); Francisco Maldonado Martos, Madrid (ES); Miguel Angel Muñoz de la Torre Alonso, Madrid (ES); Veronica Sanchez Vega, Madrid (ES); John Woods, Madrid (ES)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 97 days.

(21) Appl. No.: 14/907,107

(22) PCT Filed: Jul. 25, 2013

(86) PCT No.: PCT/EP2013/065742
§ 371 (c)(1),
(2) Date: Jan. 22, 2016

(87) PCT Pub. No.: WO2015/010742
PCT Pub. Date: Jan. 29, 2015

(65) Prior Publication Data
US 2016/0192199 A1 Jun. 30, 2016

(51) Int. Cl.
*H04M 1/66* (2006.01)
*H04M 1/68* (2006.01)
(Continued)

(52) U.S. Cl.
CPC ......... *H04W 12/12* (2013.01); *H04L 63/1408* (2013.01)

(58) Field of Classification Search
CPC ......... H04M 2201/12; H04M 2201/14; H04M 2201/18; H04M 3/42382; H04M 3/436
(Continued)

(56) References Cited

U.S. PATENT DOCUMENTS

| 7,720,050 B1 * | 5/2010 | Blank ..................... H04J 3/085 370/352 |
| 8,086,585 B1 * | 12/2011 | Brashers ........... G06F 17/30097 707/705 |

(Continued)

FOREIGN PATENT DOCUMENTS

EP   2 538 628 A2   12/2012

OTHER PUBLICATIONS

PCT Notification of Transmittal of the International Search Report and the Written Opinion of the International Searching Authority, or the Declaration for International application No. PCT/EP2013/065742, dated Jul. 23, 2014.
(Continued)

*Primary Examiner* — Joseph Arevalo
(74) *Attorney, Agent, or Firm* — Baker Botts, LLP

(57) ABSTRACT

Methods and apparatus for detecting fraudulent traffic associated with a user of a telecommunications system. A system comprises a monitoring network node comprising a traffic monitor configured to monitor traffic transmitted to or from a user in the telecommunications system, a fraud detector configured to apply to the monitored traffic a fraud profile associated with the user to determine whether the monitored traffic comprises fraudulent traffic, a transmitter configured to transmit data to a receiver of a profiling network node notifying whether the monitored traffic comprises fraudulent traffic. The profiling network node further comprises a fraud profiler configured to determine an updated fraud profile associated with the user based at least on the received data and a transmitter configured to transmit data identifying the
(Continued)

updated fraud profile to one or both of a receiver of a subscription profile repository and a receiver of the monitoring network node.

20 Claims, 5 Drawing Sheets

(51) Int. Cl.
*H04M 3/16* (2006.01)
*H04W 12/12* (2009.01)
*H04L 29/06* (2006.01)

(58) Field of Classification Search
USPC ...... 455/410, 69, 406, 456.3, 423, 411, 466, 455/422.1; 370/467
See application file for complete search history.

(56) References Cited

U.S. PATENT DOCUMENTS

| | | | |
|---|---|---|---|
| 8,949,928 B2* | 2/2015 | Perez Martinez | H04L 63/0245 726/1 |
| 9,270,690 B2* | 2/2016 | Kraitsman | H04L 63/1408 |
| 2007/0133602 A1* | 6/2007 | Russell | H04L 51/12 370/467 |
| 2008/0126746 A1* | 5/2008 | Hyduke | G06F 21/552 712/17 |
| 2012/0331516 A1* | 12/2012 | Perez Martinez | H04L 63/0245 726/1 |
| 2014/0283061 A1* | 9/2014 | Quinlan | H04L 63/1408 726/23 |

OTHER PUBLICATIONS

3GPP TS 23.203 v12.1.0; Technical Specification; 3rd Generation Partnership Project; Technical Specification Group Services and System Aspects; Policy and charging control architecture (Release 12), dated Jun. 2013.

3GPP TS 29.212 v11.9.0; Technical Specification; 3rd Generation Partnership Project; Technical Specification Group Core Network and Terminals; Policy and Charging Control (PCC); Reference points (Release 11), dated Jun. 2013.

* cited by examiner

DETECTING FRAUDULENT TRAFFIC IN A TELECOMMUNICATIONS SYSTEM

PRIORITY

This nonprovisional application is a U.S. National Stage Filing under 35 U.S.C. § 371 of International Patent Application Serial No. PCT/EP2013/065742, filed Jul. 25, 2013, and entitled "Detecting Fraudulent Traffic In A Telecommunications System."

TECHNICAL FIELD

The invention relates to detecting fraudulent traffic in a telecommunications system.

BACKGROUND

As defined herein, fraud encompasses intentional deception made for personal gain or to damage another entity (e.g., a company and/or an individual). Defrauding entities of money or valuables is a common purpose of fraud. An example of fraud in the mobile telecommunications field is subscribers (users) who undertake deception in an attempt to be charged less for services than they should be charged according to their tariffs, which have been agreed with their operator.

A specific type of fraud in the mobile telecommunications field occurs in a Policy and Charging Control (PCC) architecture. The PCC architecture permits integration of both policy and charging control. An exemplary architecture that supports PCC functionality is shown in FIG. 1, which has been taken from Third Generation Partnership Protocol (3GPP) TS 23.203. 3GPP TS 23.203 specifies the PCC functionality for an Evolved 3GPP Packet Switched domain, including both 3GPP accesses and Non-3GPP accesses. 3GPP accesses include for example, Global System for Mobile Communications (GSM) Enhanced Data rates for GSM Evolution (EDGE) Radio Access Network (GERAN), Universal Terrestrial Radio Access Network (UTRAN) and Evolved UTRAN (E-UTRAN).

Referring to FIG. 1, a subscription profile repository (SPR) 100 is in electrical communication with a policy and charging rules function (PCRF) 102 via an Sp interface. The PCRF 102 is also in electrical communication with: a bearer binding and event reporting function (BBERF) 104 via an S7x interface; a traffic detection function (TDF) 106 via an Sd interface; a policy and charging enforcement function (PCEF) 108 via a Gx interface; and an application function (AF) 110 via an Rx interface. The PCEF 108 may form part of a gateway 112. The gateway 112 is in electrical communication with a service data flow based credit control function 114 via a Gv interface. The service data flow based credit control function 114 forms part of an online charging system (OCS) 116. The gateway 112 is in electrical communication with an offline charging system (OFCS) 118 via a Gz interface.

To aid description of the methods and apparatus disclosed herein, certain features of FIG. 1 are discussed below.

The PCRF 102 is a functional element that performs policy control decision and flow based charging control. The PCRF 102 provides network control regarding service data flow detection, gating, quality of service and flow based charging (except credit management) towards the PCEF 108

The PCEF 108 provides service data flow detection, policy enforcement and flow based charging functionalities. Deep packet inspection (DPI) functionality embedded in the PCEF 108 supports packet inspection and service classification, which may be undertaken on Internet protocol (IP) packets classified according to a configured tree of rules so that they are assigned to a particular service session The TDF 106 may be a stand-alone function or may be collocated with the PCEF 108. The DPI functionality may complementary or alternatively be embedded in the TDF. The reader is directed to 3GPP TR 23.813 for further details The Sd reference point (or interface) is defined in 3GPP TS 29.212 and lies between the PCRF 102 and a standalone TDF 106

The Gx reference point is defined in 3GPP TS 29.212 and lies between the PCRF 102 and the PCEF 108

The Gy reference point is defined in 3GPP TS 32.299 and lies between the PCEF 108 and the OCS 116

The SPR logical entity contains all subscriber/subscription related information needed by the PCRF 102 for subscription-based policies and IP connectivity access network (CAN) bearer level PCC rules Online charging solutions based on a PCC architecture such as that shown in FIG. 1 charge for end-user traffic based on predefined tariffs. Those tariffs are established according to user subscription data and a mobile operator's strategy. Additionally, the mobile operator may apply a service classification to charge each of a plurality of services in a different way.

There are a number of software programs that try to commit fraudulent activity by confusing a mobile operator's detection algorithms, which are designed to detect fraudulent user behaviour. The software programs aim to have traffic mistakenly classified as a free service or a cheaper service than it should have been according to a user's tariff. Exemplary software programs may obfuscate original traffic by disguising it as a new type of traffic. In this way software programs may seek to gain more credit than a user is entitled to. So, fraudulent traffic may try to cause an incorrect classification of that traffic into a category other than the real one to which the traffic belongs. This fraudulent traffic is intended to be categorized as a cheaper service, typically a free service.

For detection of fraudulent traffic generated by end users on the Internet, a large amount of online data analysis is required in the PCEF 108. This type of analysis consumes CPU and memory resources in the PCEF 108.

SUMMARY

It is an object of the invention to alleviate some of the disadvantages with current systems for detecting and/or managing fraudulent traffic in a telecommunications system.

According to the invention in a first aspect, there is provided a monitoring network node for detecting fraudulent traffic in a telecommunications system. The monitoring network node comprises a traffic monitor configured to monitor traffic to or from a user in the telecommunications system. The monitoring network node comprises a fraud detector configured to apply to the monitored traffic a fraud profile associated with the user to determine whether the monitored traffic comprises fraudulent traffic. The monitoring network node comprises a transmitter configured to transmit data notifying whether the monitored traffic comprises traffic determined to be fraudulent traffic. The monitoring network node comprises a receiver configured to receive data identifying an updated fraud profile for the user.

The fraud detector is configured to apply the identified updated fraud profile to detect further fraudulent traffic in monitored traffic transmitted to or from the user.

By applying a fraud profile, traffic monitor is able to tailor the amount of monitoring and/or fraud detection to a specific user. This has advantages in that resources may be more efficiently used.

Optionally, the traffic monitor is configured to monitor the traffic based on the fraud profile, and wherein the traffic monitor is configured to apply the identified updated fraud profile to monitor further traffic transmitted to or from the user.

Optionally, the data notifying whether the monitored traffic comprises fraudulent traffic comprises one or more of: a service identifier identifying a service during which monitored traffic is determined to comprise fraudulent traffic; data identifying the user; and a fraud probability indicating a probability that the monitored traffic comprises fraudulent traffic.

Optionally, the fraud detector is configured to determine the fraud probability based on one or more of: a number of times that the monitored traffic has been identified as comprising fraudulent traffic in a user session; a change in a ratio of free services to chargeable services compared to historical data for the user; a change in a ratio of free services to chargeable services compared to other users.

Optionally, the fraud detector is configured to undertake one or more of the following, based on whether the monitored traffic is determined to comprise fraudulent traffic: drop a service during which monitored traffic is determined to comprise fraudulent traffic; limit the bandwidth of the user; trigger a session disconnection for the user; redirect the user to a fraudulent web portal; obtain a trace of a current service; mark the monitored traffic with a differentiated services code point code identifying that the traffic is fraudulent traffic; write one or more charging data records comprising a fraudulent user field.

Optionally, the monitoring network node is further configured to undertake the function of a PCEF or a combined PCEF and TDF.

According to the invention in a second aspect, there is provided a method for detecting fraudulent traffic in a telecommunications system. The method comprises monitoring, by a traffic monitor, traffic to or from a user in the telecommunications system. The method comprises determining, by a fraud detector, whether the monitored traffic comprises fraudulent traffic by applying a fraud profile associated with the user to the monitored traffic. The method comprises transmitting, by a transmitter, data notifying whether the monitored traffic comprises traffic determined to be fraudulent traffic. The method comprises receiving, by a receiver, data identifying an updated fraud profile associated with the user. The method comprises applying, by the fraud detector, the identified updated fraud profile to detect further fraudulent traffic transmitted to or from the user.

According to the invention in a third aspect, there is provided a non-transitory computer readable medium comprising computer readable code configured, when read and executed by a computer, to carry out the method described above.

According to the invention in a fourth aspect, there is provided a computer program comprising computer readable code configured, when read and executed by a computer, to carry out the method described above.

According to the invention in a fifth aspect, there is provided a profiling network node for determining a fraud profile associated with a user of a telecommunications system. The profiling network node comprises a receiver configured to receive data notifying whether monitored traffic transmitted to or from a user in the telecommunications system is determined to comprise fraudulent traffic. The profiling network node comprises a fraud profiler configured to determine a fraud profile associated with the user based at least on the received data, wherein the fraud profile is for use detecting further fraudulent traffic. The profiling network node comprises a transmitter configured to transmit data identifying the fraud profile.

Optionally, the fraud profiler is further configured to determine the fraud profile based on a previous fraud profile.

Optionally, the transmitter is configured to transmit data identifying the fraud profile to a subscription profile repository for storage.

Optionally, the transmitter is configured to transmit data identifying the fraud profile to a monitoring network node.

Optionally, the receiver is configured to receive notification that a user has logged on to the telecommunications system, and wherein the transmission of the data identifying the fraud profile to the monitoring network node is in response to the received notification.

Optionally, in response to receipt of the notification that a user has logged onto the telecommunications system, the transmitter is configured to transmit a request for data identifying the fraud profile associated with the user to a subscription profile repository, and wherein the receiver is further configured to receive the data identifying the fraud profile from the subscription profile repository, and wherein the data identifying the fraud profile transmitted to the monitoring network node is the retrieved data identifying the fraud profile.

Optionally, the profiling network node is further configured to undertake the function of a PCRF.

According to the invention in a sixth aspect, there is provided a method for determining a fraud profile for a user of a telecommunications system. The method comprises receiving, by a receiver, data notifying whether monitored traffic transmitted to or from a user in the telecommunications system is determined to comprise fraudulent traffic. The method comprises determining, by a fraud profiler, a fraud profile associated with the user based at least on the received data, wherein the fraud profile is for use detecting further fraudulent traffic. The method comprises transmitting, by a transmitter, data identifying the fraud profile.

According to the invention in a seventh aspect, there is provided a non-transitory computer readable medium comprising computer readable code configured, when read and executed by a computer, to carry out the method described above.

According to the invention in a eighth aspect, there is provided a computer program comprising computer readable code configured, when read and executed by a computer, to carry out the method described above.

According to the invention in a ninth aspect, there is provided a subscription profile repository. The subscription profile repository comprises a receiver configured to receive data identifying a fraud profile associated with a user of a telecommunications system. The subscription profile repository comprises a fraud profile data recorder configured to store the received data identifying the fraud profile in a memory.

Optionally, the receiver is configured to receive from a requester node a request for data identifying a fraud profile associated with a user, and wherein the fraud profile data recorder is configured to retrieve the data identifying the fraud profile from the memory, the subscription profile repository further comprising a transmitter configured to transmit the retrieved data identifying the fraud profile to the requester node.

According to the invention in a tenth aspect, there is provided a method for operating a subscription profile repository. The method comprises receiving, by a receiver, data identifying a fraud profile associated with a user of a telecommunications system. The method comprises storing, by a fraud profile data recorder, the received data identifying the fraud profile in a memory.

According to the invention in an eleventh aspect, there is provided a non-transitory computer readable medium comprising computer readable code configured, when read and executed by a computer, to carry out the method described above.

According to the invention in a twelfth aspect, there is provided a computer program comprising computer readable code configured, when read and executed by a computer, to carry out the method described above.

According to the invention in a thirteenth aspect, there is provided a telecommunications system for detecting fraudulent traffic. The system comprises a monitoring network node comprising a traffic monitor configured to monitor traffic transmitted to or from a user in the telecommunications system, a fraud detector configured to apply to the monitored traffic a fraud profile associated with the user to determine whether the monitored traffic comprises fraudulent traffic, a transmitter configured to transmit data to a receiver of a profiling network node notifying whether the monitored traffic comprises fraudulent traffic. The profiling network node further comprises a fraud profiler configured to determine an updated fraud profile associated with the user based at least on the received data and a transmitter configured to transmit data identifying the updated fraud profile to one or both of a receiver of a subscription profile repository and a receiver of the monitoring network node.

Optionally, the data identifying the updated fraud profile is transmitted to the subscription profile repository, and wherein the subscription profile repository further comprises a fraud profile data recorder configured to store the received data identifying the updated fraud profile in a memory.

Optionally, the receiver of the profiling network node is configured to receive notification from the network monitoring node that a user has logged on to the telecommunications system, and wherein the transmitter of the profiling network node is configured to transmit the data identifying the updated fraud profile associated with the monitoring network node.

Optionally, the transmitter of the profiling network node is further configured to transmit a request for data identifying the updated fraud profile associated with the user to the receiver of the subscription profile repository, wherein the profile data recorder is configured to retrieve the data identifying the updated fraud profile from the memory, the subscription profile repository further comprising a transmitter configured to transmit the retrieved data identifying the updated fraud profile to the receiver of the profiling network node.

According to the invention in a fourteenth aspect, there is provided a method for operating a telecommunications system. The method comprises monitoring, by a traffic monitor of a monitoring network node, traffic transmitted to or from a user in the telecommunications system. The method comprises applying, by a fraud detector of the monitoring network node, a fraud profile associated with the user to the monitored traffic to determine whether the monitored traffic comprises fraudulent traffic. The method comprises transmitting, by a transmitter of the monitoring network node, data to a receiver of a profiling network node notifying whether the monitored traffic comprises fraudulent traffic. The method comprises determining, by a fraud profiler of the profiling network node, an updated fraud profile associated with the user based at least on the received data. The method comprises transmitting, by a transmitter of the profiling network node, the data identifying the updated fraud profile to one or both of a receiver of a subscription profile repository and a receiver of the monitoring network node.

According to the invention in a fifteenth aspect, there is provided a non-transitory computer readable medium comprising computer readable code configured, when read and executed by a computer, to carry out the method described above.

According to the invention in a sixteenth aspect, there is provided a computer program comprising computer readable code configured, when read and executed by a computer, to carry out the method described above.

BRIEF DESCRIPTION OF THE DRAWINGS

Exemplary methods and apparatus are described herein with reference to the accompanying drawings, in which.

DETAILED DESCRIPTION

Generally, the methods and apparatus disclosed herein provide for offline analysis of a user's traffic to determine the level of online analysis of the user's future traffic to be undertaken. As used herein, the term "user traffic" encompasses traffic transmitted to or from a user. This allows the amount of online analysis to be tailored to a particular user, reducing the overall computational burden. As used herein, the term "online analysis" encompasses monitoring of user traffic in real time or near real time and the term "offline analysis" encompasses historical analysis of previously stored online analysis data. Online analysis may include one or more of: shallow inspection; deep packet inspection; deep packet inspection with heuristic analysis; and deep packet inspection with checking of all attributes. Offline analysis may include one or more of: comparing evolution of free service to chargeable service; and counting the number of times that fraudulent traffic is detected in a user session.

As used herein, the term "session" when applied to a user encompasses to a period of time during which a user is logged on to a core network. The session may, for example, be an IP Connectivity Access Network, hereinafter IP-CAN, session.

The methods and apparatus disclosed may provide an iterative method for detecting fraudulent traffic in a particular user's traffic associated with a particular service in a telecommunications network.

Figure 1:
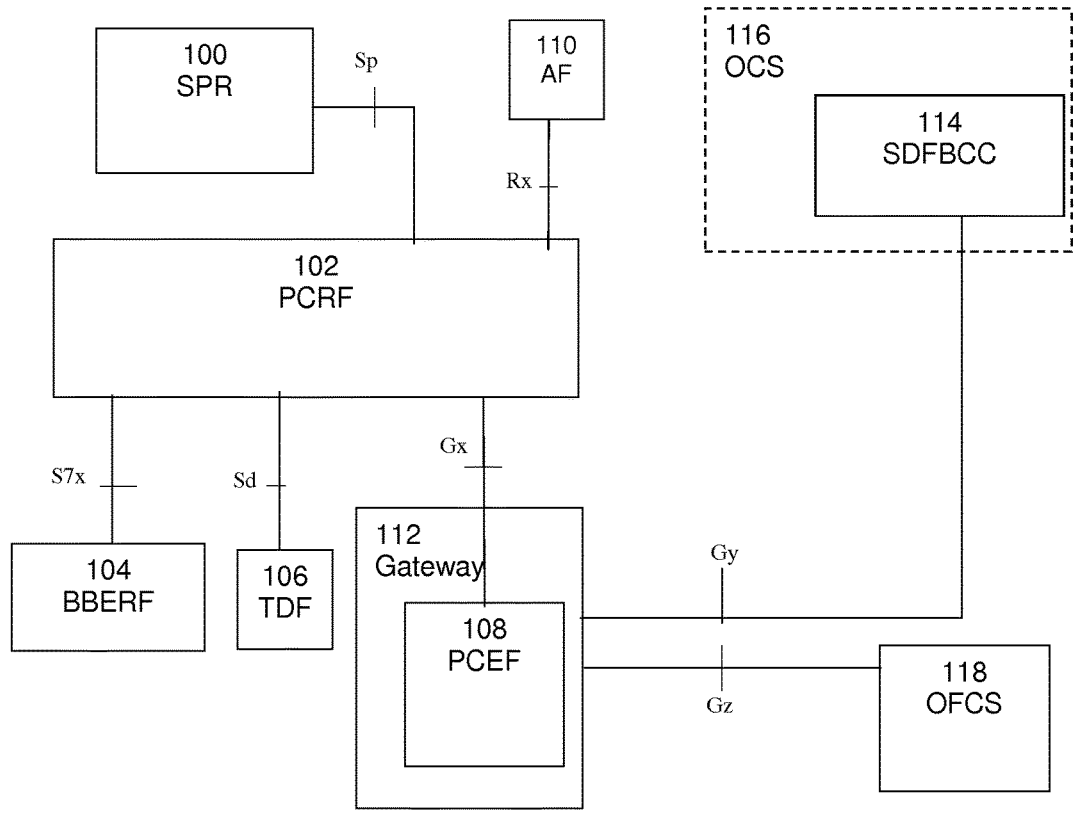
FIG. 1 is a schematic representation of a PCC architecture.
Figure 2:
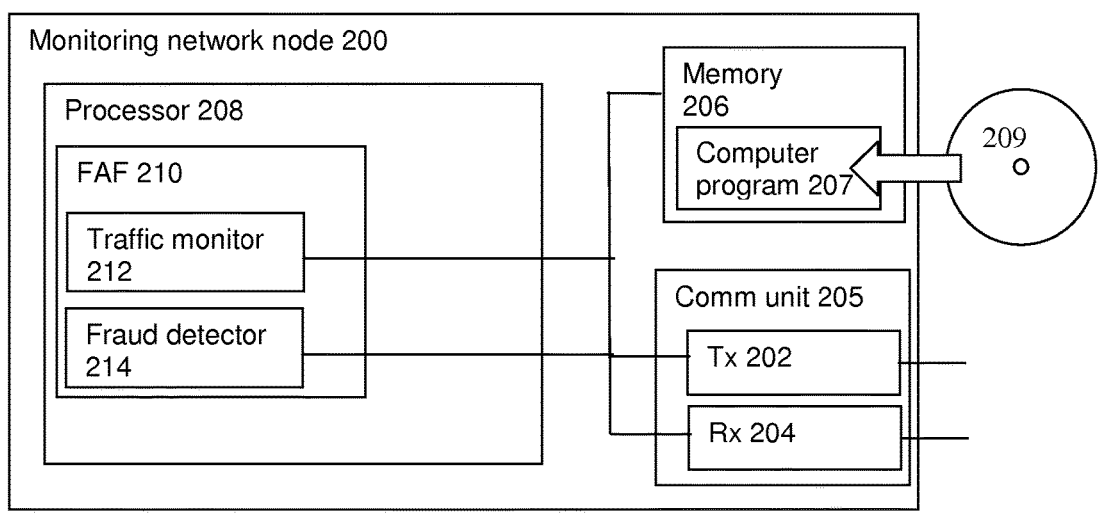
FIG. 2 is a schematic representation of a monitoring network node.

FIG. 2 shows a schematic representation of a monitoring network node 200. The methods and apparatus disclosed herein permit the monitoring network node 200 to monitor user traffic associated with a service and determine whether the monitored traffic is fraudulent traffic. The monitoring and/or the detection of fraudulent traffic may be undertaken by applying a fraud profile. The monitoring network node 200 comprises a transmitter 202 and a receiver 204, which form part of a communication unit 205. The transmitter 202 and receiver 204 are in electrical communication with other nodes, UEs and/or functions in a telecommunications system and are configured to transmit and receive data accordingly.

As used herein, the term "fraud profile" encompasses a set of rules governing how the monitoring network node should monitor and/or detect fraudulent traffic. A fraud profile may comprise rules that define online analysis techniques that should be used to detect future fraudulent traffic. That is, a fraud profile may define what amount of monitoring of user traffic is undertaken. A fraud profile may also define what analysis of monitored traffic is undertaken to determine whether the monitored traffic comprises fraudulent traffic. Further, a fraud profile may comprise rules that define what enforcement actions should be taken if fraudulent traffic is detected.

The monitoring network node 200 further comprises a memory 206 and a processor 208. The memory 206 may comprise a non-volatile memory and/or a volatile memory. The memory 206 may have a computer program 207 stored therein. The computer program 207 may be configured to undertake the methods disclosed herein. The computer program 207 may be loaded in the memory 206 from a non-transitory computer readable medium 209, on which the computer program is stored. The processor 208 is configured to undertake the functions of a fraud analytics function 210, which comprises a traffic monitor 212 and a fraud detector 214.

Each of the transmitter 202, receiver 204, communications unit 205, memory 206, processor 208, fraud analytics function 210, traffic monitor 212 and fraud detector 214 is in electrical communication with the other features 202, 204, 205 206, 208, 210, 212, 214 of the monitoring network node 200. The monitoring network node 200 can be implemented as a combination of computer hardware and software. In particular, fraud analytics function 210, traffic monitor 212 and fraud detector 214 may be implemented as software configured to run on the processor 208. The memory 206 stores the various programs/executable files that are implemented by a processor 208, and also provide a storage unit for any required data. The programs/executable files stored in the memory 206, and implemented by the processor 208, can include the fraud analytics function 210, traffic monitor 212 and fraud detector 214, but are not limited to such.

The fraud analytics function 210 is configured to undertake certain methods as defined herein. The monitoring network node 200 may be a stand alone TDF 106, a stand alone PCEF 108 equipped with DPI functionality, or a combined TDF 106 and PCEF 108. Alternatively, the monitoring network node 200 may be a separate node configured to gather data from a TDF 106.

Figure 3:
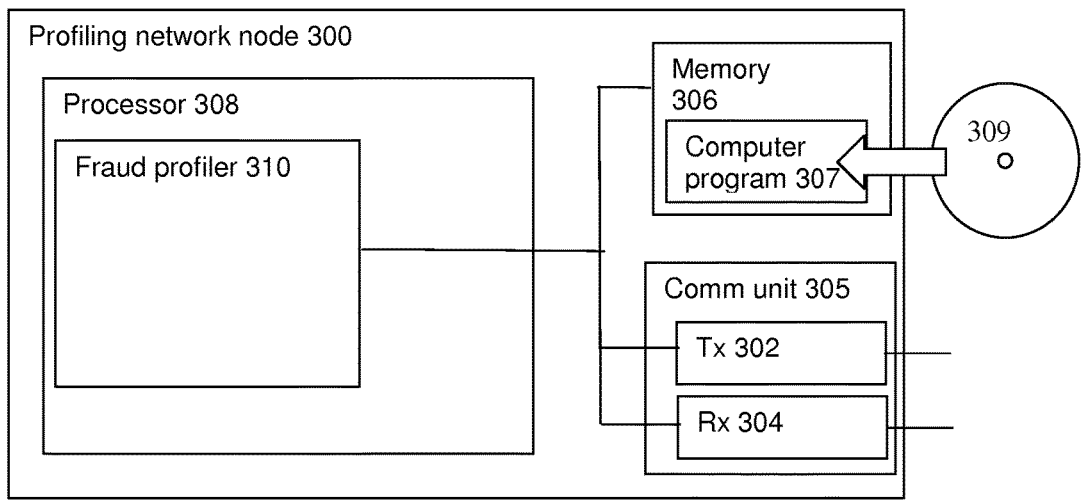
FIG. 3 is a schematic representation of a profiling network node.

FIG. 3 shows a schematic representation of a profiling network node 300. The profiling network node 300 comprises a transmitter 302 and a receiver 304, which form part of a communication unit 305. The transmitter 302 and receiver 304 are in electrical communication with other nodes, UEs and/or functions in a telecommunications system and are configured to transmit and receive data accordingly.

The profiling network node 300 further comprises a memory 306 and a processor 308. The memory 306 may comprise a non-volatile memory and/or a volatile memory. The memory 306 may have a computer program 307 stored therein. The computer program 307 may be configured to undertake the methods disclosed herein. The computer program 307 may be loaded in the memory 306 from a non-transitory computer readable medium 309, on which the computer program is stored. The processor 308 is configured to undertake the functions of fraud profiler 310.

Each of the transmitter 302, receiver 304, communications unit 305, memory 306, processor 308 and fraud profiler 310 is in electrical communication with the other features 302, 304, 305 306, 308, 310 of the profiling network node 300. The profiling network node 300 can be implemented as a combination of computer hardware and software. In particular, fraud profiler 310 may be implemented as software configured to run on the processor 308. The memory 306 stores the various programs/executable files that are implemented by a processor 308, and also provide a storage unit for any required data. The programs/executable files stored in the memory 306, and implemented by the processor 308, can include the fraud profiler 310, but are not limited to such.

The profiling network node may be a PCRF 102.

Figure 4:
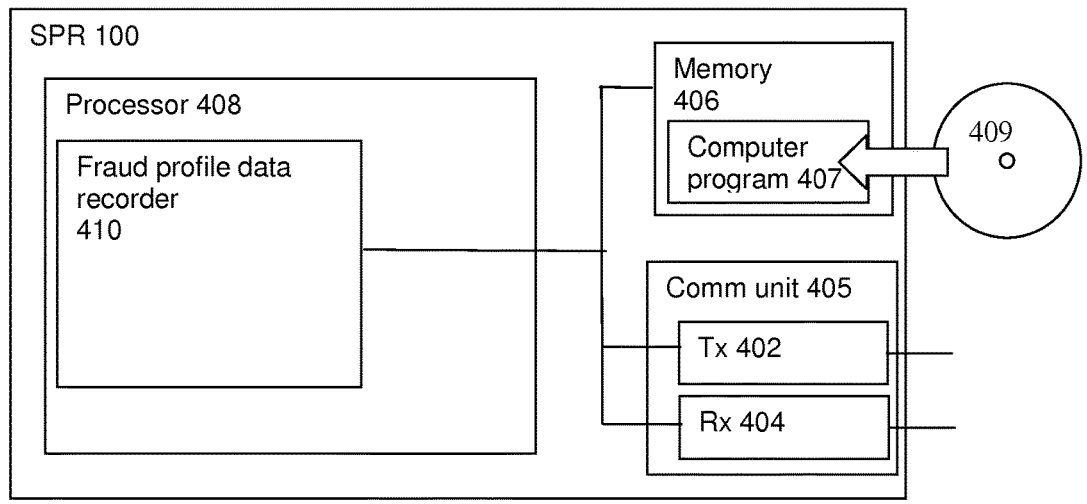
FIG. 4 is a schematic representation of a subscription profile repository.

FIG. 4 shows a schematic representation of an SPR 100. The SPR 100 comprises a transmitter 402 and a receiver 404, which form part of a communication unit 405. The transmitter 402 and receiver 404 are in electrical communication with other nodes, UEs and/or functions in a telecommunications system and are configured to transmit and receive data accordingly.

The SPR 100 further comprises a memory 406 and a processor 408. The memory 406 may comprise a non-volatile memory and/or a volatile memory. The memory 406 may have a computer program 407 stored therein. The computer program 407 may be configured to undertake the methods disclosed herein. The computer program 407 may be loaded in the memory 406 from a non-transitory computer readable medium 409, on which the computer program is stored. The processor 408 is configured to undertake the functions of fraud profile data recorder 410.

Each of the transmitter 402, receiver 404, communications unit 405, memory 406, processor 408 and fraud profile data recorder 410 is in electrical communication with the other features 402, 404, 405 406, 408, 410 of the SPR 100. SPR 100 can be implemented as a combination of computer hardware and software. In particular, fraud profile data recorder 410 may be implemented as software configured to run on the processor 408. The memory 406 stores the various programs/executable files that are implemented by a processor 408, and also provide a storage unit for any required data. The programs/executable files stored in the memory 406, and implemented by the processor 408, can include the fraud profile data recorder 410, but are not limited to such.

The transmitter 202 of the monitoring network node 200 may be configured to notify fraudulent traffic to a profiling network node 300, such as the PCRF 102. The traffic monitor 212 is configured to monitor a user's traffic associated with a service and the fraud detector 214 is configured to determine whether the monitored traffic is fraudulent traffic. The traffic monitor 212 and the fraud detector 214 may undertake these tasks by applying the fraud profile to user traffic. The detection may be based on knowledge from previous monitored traffic for the user. For example, the PCRF 102 may use previous monitored traffic to determine a fraud profile for the user, which may be stored in a database of the SPR 100. The fraud profile may then be used by the monitoring network node 200 to monitor user traffic and determine whether a monitored traffic is fraudulent.

In addition, the network node may activate in real-time corresponding fraud detection mechanisms and anti-fraud enforcement actions in the PCEF 102 for that user and/or service.

Defined herein is a functional element called a fraud analytics function 210, which may be hosted in the monitoring network node 200. The fraud analytics function 210 is responsible for at least the following:
  Monitoring user traffic in a telecommunications system
  Processing and analysing monitored traffic including service usage information, user session characteristics and user charging information provided by online analysis
  Based at least on one or more of the above, detecting potentially fraudulent traffic using offline analysis The fraud analytics function 210 complements the online fraudulent traffic analysis performed by the PCEF 108 and/or the TDF 106. The monitoring network node 200 comprising the fraud analytics function 210 reports to the PCRF 102 the service and end user where fraud has been detected. In addition, the monitoring network node 200 sends a fraud probability indicating how reliable the detection of fraudulent traffic is.

With the information received from the monitoring network node 200, the profiling network node 300 is configured to determine a specific fraud profile that can be applied to the user when analysing further monitored traffic. The further monitored traffic may be monitored at some time in the future. The fraud profile may be applied when monitoring traffic to determine what level of monitoring is required.

The fraud profile defines actions that may be performed for this user. The profiling network node 300 may then transmit the fraud profile to the SPR 100 for storage in the memory 406 and for use in subsequent sessions. Alternatively or in addition, the profiling network node 300 may transmit the fraud profile to the monitoring network node 200 for use in detection and/or monitoring of future fraudulent user traffic.

The profiling network node 300 may request the fraud profile from the SPR 100 and transmit it to the monitoring network node 200, which comprises the fraud analytics function 210, as necessary. For example, the next time the user opens an IP-CAN session or if the current IP-CAN session is still active, the profiling network node 300 may send to the monitoring network node 200 the fraud profile with possible actions and the type of detection to be done in case a fraudulent service is detected.

According to the information received in the fraud profile, the monitoring network node 200 may select which level or type of monitoring and/or detection is to be performed on any further traffic transmitted to or from the user. This results in a reduction in the use of computational resources in the monitoring network node 200, as traffic monitoring and/or fraud detection may be tailored to an individual user based on his/her historic fraud activities.

As discussed above, the PCEF 108 is responsible for enforcing policies with respect to authentication of subscribers, authorization to access and services, and accounting and mobility. It is also responsible for DPI. The TDF 106 is responsible for service detection and in the case of a standalone TDF 106 node, it also has some responsibility for enforcement of sanctions in the event that fraudulent traffic is detected. The PCRF 102 houses individual policies defining network, application, and subscriber conditions that must be met in order to deliver a service or maintain the quality of service (QoS) of a given service. The SPR 100 is a logical entity that may be a standalone database or integrated into an existing subscriber database such as a Home Subscriber Server (HSS). Alternatively, the SPR may be replaced by a User Data Repository (UDR) in accordance with 3GPP TS 23.335, especially, where the PCRF 102 behaves as a Front-End server in User Data Convergence (UDC) architecture. The SPR 100 includes information such as entitlements, rate plans, etc. The SPR 100 may store the fraud profile. The SPR 100 may provide the following subscription profile information (per PDN, which is identified by the PDN identifier): a subscriber's (or user's) allowed services; for each allowed service, a pre-emption priority; information on a subscriber's allowed QoS, including the subscribed guaranteed bandwidth QoS; a subscriber's charging related information (e.g. location information relevant for charging); a subscriber's category.

The fraud analytics function 210 can be located for example in the PCEF 108, a standalone TDF 106 or externally in another node. The fraud analytics function 210 is responsible for monitoring and analysing, both online and offline, a user's traffic to determine whether it comprises fraudulent traffic. For example, the fraud analytics function 210 may analyse the evolution of a ratio of free services to chargeable services for a specific user or group of users.

Figure 5:
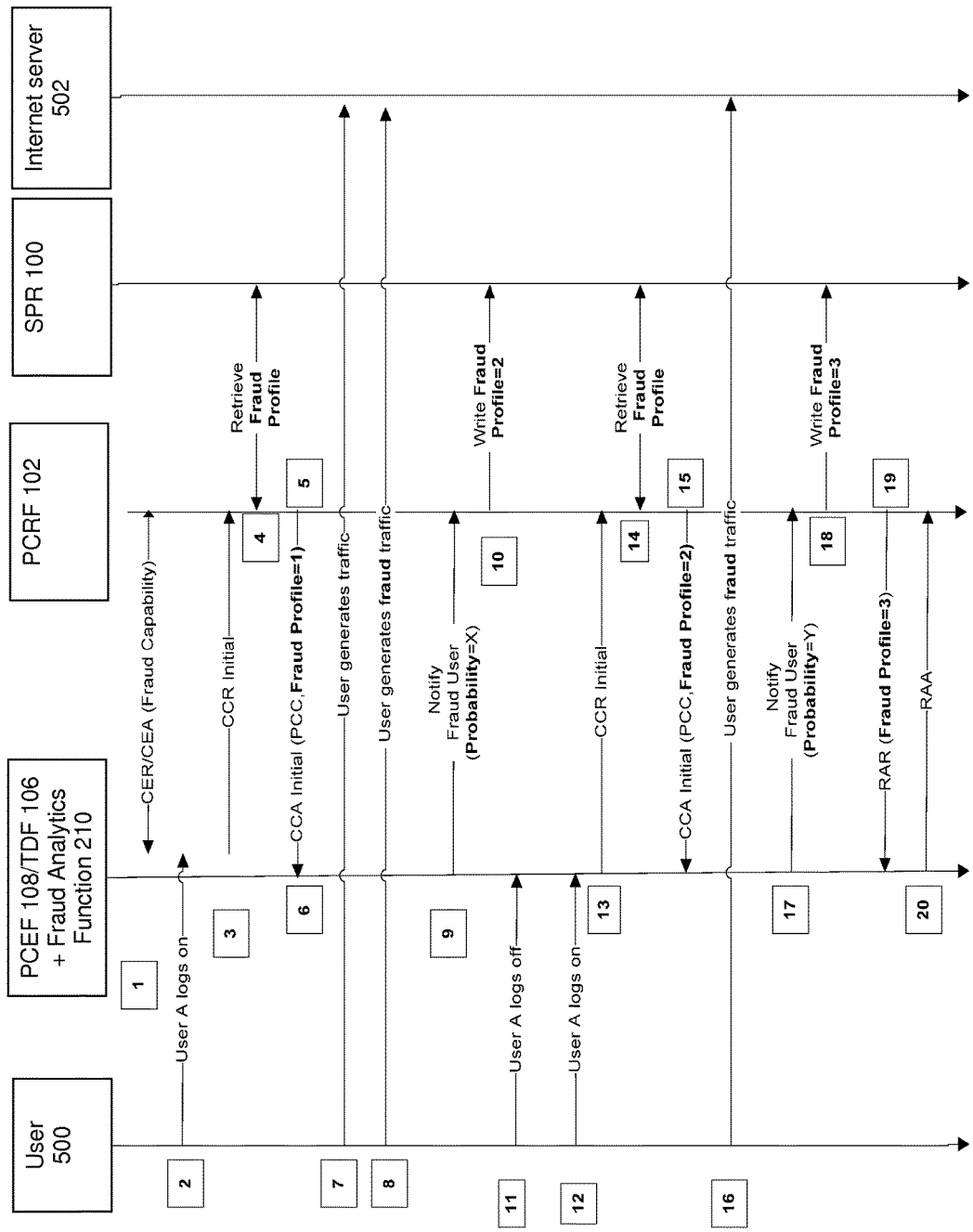
FIG. 5 is a signaling diagram showing the operation of a telecommunications system.

FIG. 5 is a signalling diagram showing steps in a method for detecting and managing fraudulent traffic in a telecommunications system. Diameter protocol is described for communication between the PCEF 108 and the PCRF 102 and between the PCEF 108 and the OCS 116, but other protocols could be used. LDAP protocol is described in the interface between the SPR 100 and the PCRF 102, but other protocols could be used.

In the exemplary signalling sequence of FIG. 5, the monitoring network node 200 is a collocated PCEF 108 and TDF 106 comprising a fraud analytics function 210. As explained above, each of those nodes/functions can be located separately. Further, the profiling network node 300 is a PCRF 102. The following numbered sequence relates to the reference numerals in FIG. 5.

1. The communication unit 202 of the PCEF 108 and the communication unit 302 of the PCRF 102 exchange capability messages in Diameter Protocol. As part of the methods and apparatus disclosed herein, an attribute called Fraud Capability has been created for checking that both nodes have this feature is supported in both nodes. An example of the Fraud Capability attribute/value pair (AVP) is provided below
   Attribute Name: Fraud Capability
   Attribute Values:
     On=0
     Off=1
   When both nodes set Fraud Capability AVP to 1, it means that both nodes support the functionality. Note it is also possible to use the Supported-Features AVP (in Gx between PCEF and PCRF, and Sd between TDF and PCRF). In this case, a new bit in Supported-Features AVP needs to be defined in order to indicate that both nodes (PCEF/TDF and PCRF)

support the Fraud Capability. In such a case, both nodes will set the corresponding bit to 1.

2. A user 500 logs on into a core packet network. When the user 500 connects to the network, a first IP-CAN session may be established at the PCEF 108/TDF 106, which comprises a fraud analytics function 210. Alternatively, an existing IP-CAN session may be modified.
3. The communication unit 202 of the PCEF 108 establishes with the communication unit 302 of the PCRF 102 an initial control session with default rules loaded. The transmitter 202 of the PCEF 108 sends a credit control request (CCR) initial using the Diameter protocol.
4. The transmitter 302 of the PCRF 102 transmits a request for a fraud profile to the receiver 404 of the SPR 100. The transmitter 402 of the SPR 100 transmits the requested fraud profile to the receiver 302 of the PCRF 102. The fraud profile is an identifier that may be used by the PCEF 108 to internally map to a specific action and type of detection to be performed by the fraud analytics function 210 of the PCEF 108/TDF 106.
5. The PCRF 102 answers the PCEF 108/TDF 106 by transmitting a credit check answer (CCA) initial in response to the CCR request in 3. The transmitter 302 of the PCRF 102 sends policy and charging control (PCC) rules and the fraud profile to the receiver 204 of the PCEF 108/TDF 106. In this example sequence, the fraud profile=1, which indicates that the user does not have a history of fraudulent traffic so no additional fraud analysis is needed.
6. The receiver 204 of the PCEF 108/TDF 106 receives the fraud profile and can determine locally which type of analysis and actions have to be performed. Therefore, in the current example as the fraud profile=1, the fraud detector 214 of the PCEF 108/TDF 106 is configured to undertake a standard fraud detection that is to be applied to all users. That is, the fraud detector 214 is configured to apply the fraud profile when determining whether future monitored user traffic comprises fraudulent traffic. Alternatively, or in addition, the traffic monitor 212 may be configured to apply the fraud profile when determining what user traffic is to be monitored.
7. The user 500 generates traffic.
8. The user 500 generates fraudulent traffic.
9. The traffic monitor 212 of the PCEF 108/TDF 106 monitors the user's traffic by applying the fraud profile. The fraud detector 214 analyses the monitored traffic to determine whether it is fraudulent traffic. In so doing, the fraud detector 214 applies the fraud profile to the monitored traffic. In the present exemplary case, the traffic is fraudulent so the fraud detector detects fraudulent traffic. The transmitter 202 of the PCEF 108 sends a CCR using Diameter protocol in the Gx interface. The CCR comprises one or more of the following.
   A service identifier identifying the service during which fraud has been detected. The service identifier may identify the service as, for example, file sharing, streaming, web access, a VoIP call, instant messaging etc. The service identifier includes service information, e.g. multimedia content reference (URL or similar)
   Information on the user that has been detected as sending fraudulent traffic, for example a Mobile Subscriber Integrated Services Digital Network Number (MSISDN) or IP address
   A probability (e.g., a percentage) of the detected traffic (and the user) being fraudulent. This value can be defined taking into account the type of detection that has been employed for this fraudulent user.

The probability may be defined in a number of ways. Exemplary fraud probabilities may be defined based on offline fraud detection techniques. For example, the probability may be determined based on the number of times that fraudulent traffic has been detected in a session. For example, if fraudulent traffic is detected greater than 20 times, the probability of fraud may be set at 90%; if fraudulent traffic is detected in the range from 10 and 20 times, the probability of fraud may be set at 50%; and if fraudulent traffic is detected fewer than 10 times, the probability of fraud may be set at 10%. The above are only examples and other values may be used, as required.

Further exemplary fraud probabilities may be defined based on a deviation of a ratio of free services versus chargeable services compared to other users of the telecommunications system. For example, an average ratio of free services to chargeable services may be determined for one or more users based on current and/or historical data and the fraud probability may be determined based on the deviation of the ratio of the present session to that average. Alternatively, fraud probabilities may be defined based on a deviation of a ratio of free services versus chargeable services compared to a history of the user. For example, an average ratio of free services to chargeable services may be determined for a user based on historical data and the fraud probability may be determined based on the deviation of the ratio of the present session to that average. In one exemplary arrangement, if the deviation in the ratio is greater than 20% the fraud probability may be set at 90%; if the deviation in the ratio is in the range from 10% and 20% the fraud probability may be set at 50%; and if the deviation in the ratio is less than 10% the fraud probability may be set at 10%. As before, the above are only examples and other values may be used, as required.

Fraud probabilities may also be determined based on online techniques. For example, detection of fraudulent traffic based on non-deterministic values, for example heuristic detection can have a fraud probability of 25%; detection of fraudulent traffic based on information on OSI layer 7, for example detection based on the universal resource locator (URL) of the hypertext transfer protocol (HTTP) traffic can have a fraud probability of 50%; and detection of fraudulent traffic based on information on OSI layers 3-4, for example based on the IP address of the monitored traffic can have a fraud probability of 90%.

Referring back to FIG. 5, the sequence continues as follows.

10. The receiver 302 of the PCRF 102 receives the CCR from the PCEF 108/TDF 106. The fraud profiler 310 analyses the information in the CCR. The fraud profiler 310 may update the fraud profile for the user based at least on the probability of the monitored traffic being fraudulent. The fraud profiler 310 may also take into account the previous fraud profile for the user. In the exemplary sequence, the fraud profile for the user is set to 2, as fraudulent traffic has been detected. As explained above, the fraud profile is a reference to the monitoring, detection and possible enforcement actions that can be performed in the PCEF 108/TDF 106. The transmitter 302 of the PCRF 102 transmits the updated fraud profile to the SPR 100, where it is received by the receiver 404. The fraud profile data recorder 410 stores the updated fraud profile in the memory 406 of the SPR

100. The SPR 100 acknowledges that the fraud profile has been stored. When the user 500 tries again to connect to the core network, the PCRF 102 may request the fraud profile from SPR 100 so the PCRF 102 knows whether the user has a history of fraudulent traffic. In other exemplary methods and apparatus, the transmitter 302 of the PCRF 102 transmits the updated fraud profile to the monitoring network node 200.

The fraud detector 214 may undertake one or more of the following enforcement actions: drop the service of the user 500 in which the fraudulent traffic is detected; limit the bandwidth of the service or for all the services for the user 500; trigger an IP-CAN session disconnection; redirect the user 500 to a fraudulent web portal, at which the user 500 is being notified that is using a fraud service and, for example, indicating that those services will be overcharged; obtain a real trace of this service for further analysis of the fraudulent service; mark the fraudulent traffic with a specific differentiated services code point (DSCP) code in the IP packet; and write charging data records (CDRs) with a new field called fraudulent user.

11. The user 500 logs off.
12. The user 500 logs on to the core packet network. When the user 500 connects to the network either a new IP-CAN session is established at the PCEF 108/TDF 106 or an existing IP-CAN session is modified
13. The PCEF 108 establishes with the PCRF 102 an initial control session with default rules loaded, as above. The PCEF 108 sends a CCR initial to the PCRF 102 using Diameter protocol.
14. The PCRF 102 requests a fraud profile from the SPR 100. In this exemplary sequence, the fraud profile is stored from the previous session (see step 10) and is set to fraud profile=2.
15. The PCRF 102 sends a CCA initial to the PCEF 108/TDF 106 in response to the CCR transmitted in 13. The PCRF 102 sends the PCC rules and the fraud profile. In this example, the fraud profile=2, which indicates that the user 500 is fraudulent so a higher level of fraud detection analysis is required.
16. The user 500 generates fraudulent traffic.
17. The fraud detector 214 updates the fraud profile that is used to detect fraudulent traffic based on the fraud profile received from the PCRF 102. The traffic monitor 212 may also apply the updated fraud profile when monitoring user traffic. The traffic monitor 212 monitors user traffic and the fraud detector uses the updated fraud profile to determine whether the monitored traffic is fraudulent traffic. The PCEF sends a CCR using Diameter protocol in the Gx interface. The CCR comprises the following information.

A service identifier identifying the service during which fraud has been detected. The service identifier may identify the service as, for example, file sharing, streaming, web access, a VoIP call, instant messaging etc. The service identifier includes service information, e.g. multimedia content reference (URL or similar)

Information on the user that has been detected as sending fraudulent traffic, for example a Mobile Subscriber Integrated Services Digital Network Number (MSISDN) or IP address A probability (e.g., a percentage) of the detected traffic (and the user) being fraudulent. This value can be defined taking into account the type of detection that has been employed for this fraudulent user.

18. As in step 10, the receiver 302 of the PCRF 102 receives the CCR from the PCEF 108/TDF 106. The fraud profiler 310 analyses the information in the CCR. The fraud profiler 310 may update the fraud profile for the user 500 based at least on the probability of the monitored traffic being fraudulent. The fraud profiler 310 may also take into account the previous fraud profile for the user. In the exemplary sequence, the fraud profile for the user is set to 3, as further fraudulent traffic has been detected. The transmitter 302 of the PCRF 102 transmits the updated fraud profile to the SPR 100, where it is received by the receiver 404. The fraud profile data recorder 410 stores the updated fraud profile in the memory 406 of the SPR 100. The SPR 100 acknowledges that the fraud profile has been stored.
19. The PCRF 102 requests the PCEF 108/TDF 106 to re-authorise the user 500 in order to send the new fraud profile. In this example the fraud profile=3, which indicates a higher level of fraud detection analysis is required and in this case, an enforcement action is applied, as discussed above.
20. PCEF/TDF with Fraud analytics function acknowledges this information.

The increasing levels of the fraud profiles result in increasing levels of fraud detection analysis performed by the fraud detector 214. These may in turn use increasing levels of online analysis. For example, the increasing levels of fraud detection analysis may use increasing levels of packet inspection, such as shallow inspection; deep packet inspection; deep packet inspection with heuristic analysis; and deep packet inspection with checking of all attributes. In addition, as the level of the fraud profile increases, the enforcement actions undertaken by the PCEF 108/TDF 106 may increase in severity.

FIGS. 6 to 9 show flow charts for detecting fraudulent traffic in a telecommunications system. The detailed description of each of the steps of FIGS. 6 to 9 is provided above with respect to FIG. 5. Therefore, the steps of FIGS. 6 to 9 are described only briefly here and the reader may rely on the description of FIG. 5 for further detail.

Figure 6:
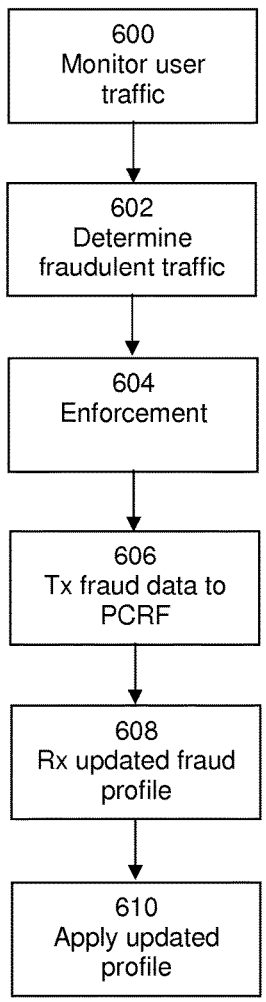
FIG. 6 is a flow diagram showing a method for determining fraudulent traffic in a telecommunications system.

Referring to FIG. 6, a method of detecting fraudulent traffic in a telecommunications system is shown. The traffic monitor 212 of the monitoring network node 200 monitors 600 user traffic. The traffic monitor may undertake this monitoring by applying the current fraud profile, which may indicate the level of traffic monitoring to undertake. The fraud detector 214 applies 602 the current fraud profile to the monitored traffic. If fraudulent traffic is detected, enforcement actions detailed above and specified by the fraud profile may be applied 604 by the fraud detector 214. Data notifying whether the monitored traffic comprises fraudulent traffic is transmitted 606 by the transmitter 202 to the receiver 304 of the profiling network node 300. At some time later, data identifying an updated fraud profile is received 608 at the receiver 204 from the profiling network node 300. The data may comprise the updated fraud profile or may allow the monitoring network node 200 to identify the updated profile. The data identifying the updated fraud profile may be received directly from the profiling network node 300 after the data notifying whether the monitored traffic comprises fraudulent traffic has been sent to the profiling network node 300. In other arrangements, the data identifying the updated fraud profile may be received when the user begins a new session or modifies an existing session. The updated fraud profile is used by the fraud detector 214 to determine the level of analysis to be performed on future monitored traffic. The updated profile may also be used by the traffic monitor 212 and applied to determine the level of user traffic monitoring. It is noted that the updated fraud profile may be the same as the current fraud profile.

Figure 7:
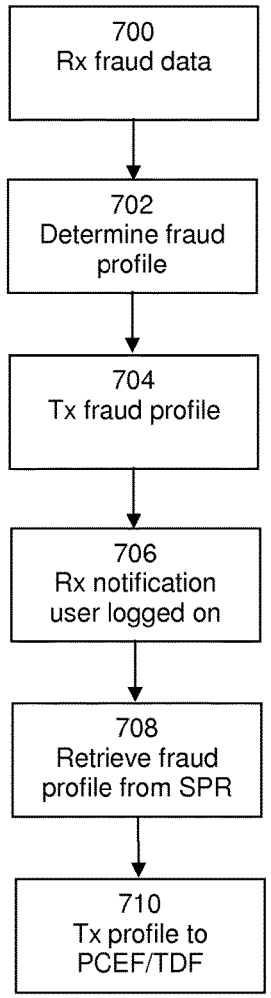
FIG. 7 is a flow diagram showing a method for determining a fraud profile.

Referring to FIG. 7, a method of operating a profiling network node 300 is shown. The receiver 304 of the profiling network node 300 receives 700 the data notifying whether the monitored traffic comprises fraudulent traffic. The fraud profiler 310 determines 702 a fraud profile. The fraud profiler 310 may determine the fraud profile based on the received data and/or the previous fraud profile for a user. The transmitter 302 transmits 704 data identifying the fraud profile. The transmitter 302 may transmit the data to the SPR 100 for storage. Alternatively or in addition, the transmitter 302 may transmit the data to the monitoring network node 200. Some time later, e.g. when the user logs on again, the receiver 304 receives 706 notification that the user has logged on. If the fraud profile has been stored in the SPR 100, the transmitter 302 and receiver 304 retrieve 708 the fraud profile by the transmitter 302 transmitting a request to the receiver 404 of the SPR 100 and the receiver 304 receiving data identifying the requested fraud profile in response. The transmitter 302 then transmits 710 the fraud profile to the monitoring network node 200.

Figure 8:
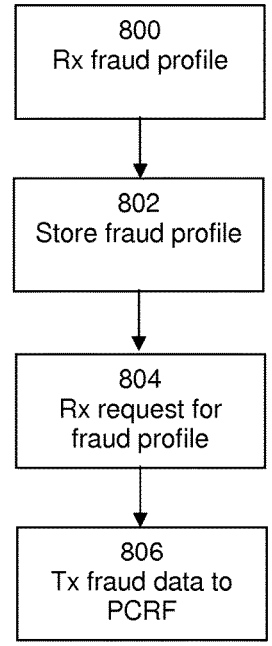
FIG. 8 is a flow diagram showing a method for operating a subscription profile repository.

Referring to FIG. 8, a method of operating an SPR 100 is shown. The receiver 404 receives 800 data identifying the fraud profile from the profiling network node 300. The fraud profile data recorder 410 stores 802 data identifying the fraud profile in the memory 406. Some time later, e.g. when the user logs on again, the receiver 404 receives 804 a request for the fraud profile associated with a user from a requester node. The requestor node may be the profiling network node 300. The data identifying the fraud profile is retrieved from memory 406 by the fraud profile data recorder 410 and transmitted 806 to the requester node by the transmitter 402.

Figure 9:
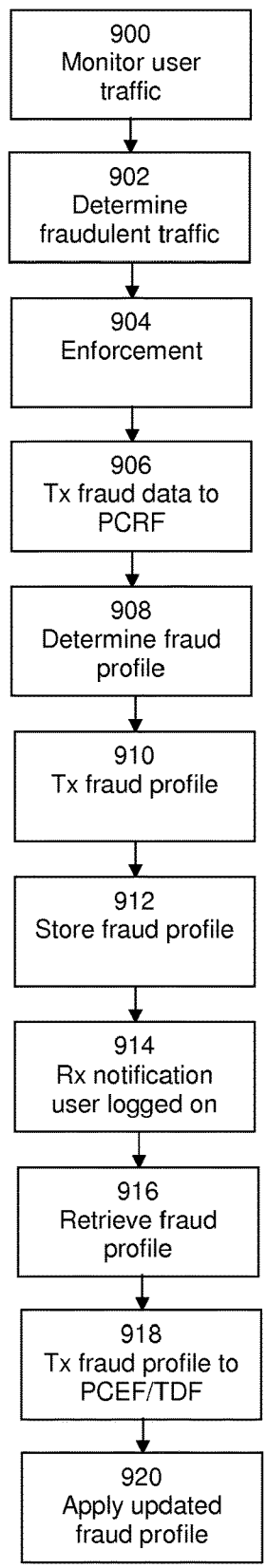
FIG. 9 is a flow diagram showing a method for operating a telecommunications system.

Referring to FIG. 9, a method of operating a telecommunications system is shown. The traffic monitor 212 monitors 900 user traffic and the fraud detector 214 applies 902 the fraud profile to the monitored data to determine if it comprises fraudulent traffic. If fraudulent traffic is detected, the fraud detector 214 applies 904 enforcement, as defined by the fraud profile. Data notifying whether the monitored traffic comprises fraudulent traffic is transmitted 906 to the profiling network node 300. The fraud profiler 310 determines 908 a fraud profile, as set out above. The fraud profile is transmitted 910 to one or both of the SPR 100 or the monitoring network node 200. If the data identifying the fraud profile is transmitted to the SPR 100, it is stored 912 in the memory 406. Some time later, e.g. when the user logs on again, the receiver 304 receives 914 notification of the use log on. The profiling network node 300 retrieves 916 the data identifying the fraud profile from the SPR 100 and transmits 918 the data identifying the fraud profile to the monitoring network node 200. The fraud detector 214 and/or the traffic monitor 212 apply 920 the updated fraud profile for use analysing future monitored data.

Exemplary methods and apparatus allow operators to make automatic decisions about fraudulent use of the telecommunications system in real time allowing for better and more efficient network usage. The operators can optimise radio resource usage, dropping those users that are fraudulent and providing more resources to non fraudulent users. In addition, operators may be able to identify which services/applications are having more fraudulent users, so they can reconsider tariffs offered for those services/applications.

In exemplary methods and apparatus, the fraud analytics function 210 may be hosted in an analytics server. Therefore, different nodes of the network, such as the TDF 106, a gateway general packet radio service (GPRS) service node (GGSN), packet data network gateway (PGW), a serving GPRS service node (SGSN) or a security gateway (SGW) can send information to the analytics server so a whole analysis of the behaviour of the user 500 in the network can be taken into account.

Further, as data identifying the fraud profile may be centralised in the SPR 100, or in a UDR not illustrated in any drawing, it is possible to apply different policies based on subscription and having a centralised network anti-fraud policy. The PCEF 108/TDF 106 can save resources by performing different online fraud detection analysis for different subscribers.

It is noted that, although the above examples show increasing levels of online analysis and enforcement following detection of fraudulent traffic, the methods and apparatus disclosed may also be used to reduce levels of online analysis and enforcement following a period of time in which there is no detection of fraudulent traffic.

Online analysis is based on analysis of user traffic comprising data packets. There are two types of analysis:
  Shallow packet inspection extracts basic protocol information such as IP addresses (source, destination) and other low-level connection states. This information typically resides in the packet header itself and consequently reveals the principal communication intent.
  DPI provides application awareness. This is achieved by analysing the content in both the packet header and the payload over a series of packet transactions. There are several possible methods of analysis used to identify and classify applications and protocols that are grouped into signatures. One of them is heuristic signatures which it is related with the behavioral analysis of the user traffic In the following exemplary use cases an analysis method employed for detecting fraudulent traffic using online techniques is described. Generally, the use cases describe fraudulent traffic that attempts to mislead a PCEF 108 by generating traffic that is disguised as signaling traffic or non-chargeable traffic.

Use Case 1: Fraudulent Proxy

In a 3GPP network which uses a PCEF 108 and DPI to charge operator's mobile broadband (MBB) services, a malicious browser may construct HTTP queries to a free url (added as front query) but with a chargeable destination IP address. Alternatively, the user may configure a directly malicious proxy address. An external malicious proxy routes the request to the real page, routes the page back to the user, which accesses it for free. The operator does not know about the existence of this fraudulent proxy and does not want to restrict allowed proxies to the operator's white list. Typically, the user is fraudulent as they might be changing proxy IP addresses as soon as possible after they are blacklisted.

Methods and apparatus disclosed may discover a fraudulent proxies list and build a list of fraudulent users using this technique. This avoids any revenue loss.

Analysis in the PCEF 108/TDF 106 is by shallow packet inspection and DPI and by comparison of information on OSI Layer 7 (url on http request) with information on OSI Layer 3 (destination IP address).

Via the fraud profile, the PCRF 102 may configure the PCEF 108/TDF 106 for detection of this fraud type for subscribers that have no or a minimal charging balance or have a previous fraud history. Using the fraud profile, the PCRF 102 may configure enforcement actions mentioned above. If this fraud profile is enabled, the PCEF 108/TDF 106 analyses the url of the user who is accessing the free operator url and compares it to the possible IP address of the operator's web server. If there is no match, the PCEF 108/TDF 106 reports to the PCRF 102. If requested, the PCEF 108 can take enforcement actions. The PCRF 102 may then update subscriber fraud profile in SPR.

Use Case 2: Port Scanning

In a 3GPP network which uses a PCEF 108 and DPI to charge for an operator's MBB services, a malicious user may start scanning opened TCP/UDP ports in the operator's IP network, aiming to find a port that allows a fraudulent application to be executed. The user may discover free operator proxy ports to bypass the operator's proxy accessing certain services illegitimately. The traffic generated during this process adds a significant overhead to the whole network but does not represent any revenue source to the operator.

Methods and apparatus disclosed may identify users that seek open ports for fraudulent purposes and avoid revenue loss and network overhead.

Analysis in PCEF 108/TDF 106 is by shallow packet inspection and by tracking the number of flows opened by an end user in an IP CAN session.

The PCEF 108/TDF 106 can detect (automatically or if instructed to do so by the PCRF 102) when a user has reached a maximum number of IP flows configured and report, by means of the fraud probability value described above, the likelihood of having a fraudulent user. Then the PCRF 102 can check in the SPR 100 if the user has a previous fraud history or if the same report has been sent by the PCEF 108/TDF 106 several times in the past and it may therefore be concluded that this user is fraudulent. The PCRF 102 may configure (via the Gx interface fraud profile AVP) enforcement actions mentioned above. The PCRF 102 can also update the user fraud profile in the SPR 100 for future activity from this user.

Use Case 3: Fraud Detection in TCP Handshake

In a 3GPP network which uses a PCEF 108 and DPI to charge an operator's MBB services, the operator may have installed a charging policy where TCP signalling traffic to set up a TCP connection is not charged. Such a policy is often used when the operator charging policy is based on identification of the application that is being used, since the application is usually not yet identified by the PCEF 108/TDF 106 when the TCP setup signalling is received. A malicious user may tunnel application traffic in the TCP signalling traffic to avoid being charged for it. This typically involves a fraudulent proxy server which receives and extracts payload from adapted TCP signalling traffic sent by an associated fraudulent client software on the user's terminal device.

Methods and apparatus disclosed may identify users sending application payload traffic in the TCP setup signalling, reducing the overhead of extra uncharged signalling traffic in the network.

Analysis in PCEF 108/TDF 106 is by shallow packet inspection and checking the size and amount of TCP setup signaling packets.

The PCEF 108/TDF 106 may detect (automatically or if instructed to do so by the PCRF 102) anomalous situations where the size of the TCP signalling packets is significantly greater than normal, or where an abnormally high number of TCP setup packets are sent by a user. The PCRF 102 may check in the SPR 100 if the subscriber has a previous fraud history or if the same report has been sent by the PCEF 108/TDF 106 several times in the past and it may therefore be concluded that the user is fraudulent. The PCRF 102 can configure via the Gx interface fraud profile AVP, enforcement actions as mentioned above and can also update the subscriber fraud profile in SPR 100 for future activity from this user.

Use Case 4: Fraud Detection Using Layer 3/4 Capabilities

In a 3GPP network, which uses the PCEF 108 and DPI to charge an operator's MBB services, a malicious user may start fraudulent traffic using a well-known port that is usually employed for DNS traffic. The operator does not know about the existence of the fraudulent traffic because it has configured all the traffic that goes to the port to be considered as signaling traffic (e.g., DNS) as non-chargeable traffic.

Methods and apparatus disclosed may identify users that use well known ports to send fraudulent traffic using Layer 3/Layer 4 capabilities.

Analysis in PCEF/TDF is by shallow packet inspection and checking the length of the IP packet for traffic on well-known ports, for example port 53.

The PCEF 108/TDF 106 may determine the length of IP packets for a specific port or a group of ports. The PCEF 108/TDF 106 can report those users who are generating traffic on port 53 (which is supposed to be DNS traffic) with packets whose IP length is longer than the average IP length of other users on this port. This may be done by means of the fraud probability value described above. The PCRF 102 can check in the SPR 100 if the subscriber has a previous fraud history or if the same report has been sent by the PCEF 108/TDF 106 several times in the. The PCRF 102 can configure via the fraud profile any enforcement actions mentioned above and can also update the user fraud profile in the SPR 100 for future activity from this user.

Use Case 5: Fraud Detection Using Layer 7 Capabilities

In a 3GPP network which uses a PCEF 108 and DPI to charge an operator's MBB services, a malicious user starts fraudulent traffic using a well-known port (e.g., port 53) that is usually employed for DNS traffic. The operator does not know about the existence of this fraudulent traffic because it has configured all the traffic that goes to the port to be considered as signalling traffic (DNS) as non-chargeable traffic. Methods and apparatus disclosed may identify users that use well known ports to send fraudulent traffic using Layer 7 capabilities.

Analysis in the PCEF 108/TDF 106 is by shallow packet inspection and DPI and checking the correctness of DNS attributes for traffic that goes on the port.

For those users that have been detected on use case 3, via the fraud profile, the PCRF 102 can configure the PCEF 108/TDF 106 to check if the fields of the DNS are built according to standards. Then, the PCEF 108/TDF 106 informs to PCRF 102 according to the fraud probability value described above the likelihood of having a fraudulent user. The PCRF 102 can check in SPR 100 if the subscriber has a previous fraud history or if the same report has been sent by PCEF 108/TDF 106 several times in the past. Then PCRF 102 can configure via the fraud profile new enforcement actions mentioned above and can also update the user fraud profile in the SPR 100 for future activity from this user.

Use Case 6: Fraud Detection Using Heuristic Capabilities

In a 3GPP network which uses a PCEF 108 and DPI to charge an operator's MBB services, a malicious user starts fraudulent traffic using a well-known port (e.g., port 53) that is usually employed for DNS traffic. The operator does not know about the existence of this fraudulent traffic because it has configured all the traffic that goes to the port to be considered as signalling traffic (DNS) as non-chargeable traffic.

Methods and apparatus disclosed may identify users that use well known ports to send fraudulent traffic using Layer 7 capabilities.

Analysis in the PCEF 108/TDF 106 is by shallow packet inspection and DPI and by behavioural analysis by checking that after a DNS query there is traffic associated with this query.

For those users that have been detected on use case 3, via the fraud profile, the PCRF 102 can configure in the PCEF 108/TDF 106 detection to check if, after a DNS query, there is a service associated with this DNS. DNS queries are normally generated for solving a domain and then obtain an IP address that corresponds with this domain. Once this is solved, an HTTP request to this resolved IP address is sent. If, after a DNS query, there is no HTTP associated request, the PCEF 108 informs the PCRF 102 of having a fraudulent user. The PCRF 102 can check in the SPR 100 if the user has a previous fraud history or if the same report has been sent by PCEF 108/TDF 106 several times in the past. The PCRF 102 can configure via the fraud profile, new enforcement actions mentioned above and can also update the user fraud profile in the SPR 100 for future activity from this user.

Offline analysis is not in real time. It is based on the historical usage of services for one user, as compared with other users. It also considers the individual evolution of the usage of each service. Also, it complements online analysis by counting the number of fraudulent events performed by an end user. For example, the number of times that an end user generates a packet that is considered to be fraudulent. The following use case relates to offline analysis.

Use Case 7: Fraudulent Proxy (Offline)

In a 3GPP network which uses PCEF 108 and DPI to charge an operator's MBB services, a malicious browser constructs HTTP queries to the operator's free url (added as front query) but with a chargeable destination IP address. Alternatively, the user configures directly a malicious proxy address. An external malicious proxy routes the request to the real page, routes the page back to the user, which access it for free. The operator does not know about the existence of this fraudulent proxy and does not want to restrict allowed proxies to the operator's white list. Typically, the user is fraudulent as they might be changing proxy IP addresses as soon as possible after they are blacklisted.

Methods and apparatus disclosed may identify the fraudulent proxy list and build a list of fraudulent users using this technique to avoid immediately any revenue loss.

Via the fraud profile, the PCRF 102 can configure the PCEF 108/TDF 106 to detect this fraud type for subscribers which have no or minimal charging balance or have a previous fraud history and configure enforcement action, such as that above. If the fraud profile is enabled, the PCEF 108/TDF 106 tracks if there is a large amount of free traffic which is proxied. Via the fraud analytics function 210, the PCEF 108/TDF 106 compares user service activity against historical service activity and/or against other users activity (can compare destination IP addresses). The PCEF 108/TDF 106 may also compare destination IP addresses with other suspect cases. The PCEF 108/TDF 106 notifies the PCRF 102 if there is a suspected case of fraud, indicating the proxy IP address. If requested, the PCEF 108 can take enforcement actions such those mentioned above. The PCRF 102 updates the user fraud profile in the SPR 100.

A computer program may be configured to provide any of the above described methods. The computer program may be provided on a computer readable medium. The computer program may be a computer program product. The product may comprise a non-transitory computer usable storage medium. The computer program product may have computer-readable program code embodied in the medium configured to perform the method. The computer program product may be configured to cause at least one processor to perform some or all of the method.

Various methods and apparatus are described herein with reference to block diagrams or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

Computer program instructions may also be stored in a computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/Blu-ray).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks.

Accordingly, the invention may be embodied in hardware and/or in software (including firmware, resident software, micro-code, etc.) that runs on a processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated.

The skilled person will be able to envisage other embodiments without departing from the scope of the appended claims.

The invention claimed is:

1. A monitoring network node for detecting fraudulent traffic in a telecommunications system, the monitoring network node comprising:
   one or more processors configured to:
      monitor traffic to or from a user in the telecommunications system; and
      apply to the monitored traffic a fraud profile associated with the user to determine whether the monitored traffic comprises fraudulent traffic, wherein the fraud profile comprises rules for monitoring the user for fraudulent traffic and/or detecting fraudulent traffic to or from the user;
   a transmitter configured to transmit data notifying whether the monitored traffic comprises traffic determined to be fraudulent traffic, the data comprising an indication of a probability that the monitored traffic comprises fraudulent traffic; and
   a receiver configured to receive data identifying an updated fraud profile for the user, wherein the updated fraud profile comprises updated rules for monitoring the user based on the indication of the probability that the monitored traffic comprises fraudulent traffic for fraudulent traffic and/or detecting fraudulent traffic to or from the user;
   wherein the one or more processors are configured to apply the identified updated fraud profile to detect further fraudulent traffic in monitored traffic transmitted to or from the user.

2. A monitoring network node according to claim 1, wherein the traffic monitor is configured to monitor the traffic based on the fraud profile, and wherein the one or more processors are configured to apply the identified updated fraud profile to monitor further traffic transmitted to or from the user.

3. A monitoring network node according to claim 1, wherein the data notifying whether the monitored traffic comprises fraudulent traffic further comprises one or more of: a service identifier identifying a service during which monitored traffic is determined to comprise fraudulent traffic and data identifying the user.

4. A monitoring network node according to claim 3, wherein the one or more processors are configured to determine the fraud probability based on one or more of: a number of times that the monitored traffic has been identified as comprising fraudulent traffic in a user session; a change in a ratio of free services to chargeable services compared to historical data for the user; a change in a ratio of free services to chargeable services compared to other users.

5. A monitoring network node according to claim 1, wherein the one or more processors are configured to undertake one or more of the following, based on whether the monitored traffic is determined to comprise fraudulent traffic: drop a service during which monitored traffic is determined to comprise fraudulent traffic; limit the bandwidth of the user; trigger a session disconnection for the user; redirect the user to a fraudulent web portal; obtain a trace of a current service; mark the monitored traffic with a differentiated services code point code identifying that the traffic is fraudulent traffic; write one or more charging data records comprising a fraudulent user field.

6. A monitoring network node according to claim 1, and further configured to undertake the function of a PCEF or a combined PCEF and TDF.

7. A method for detecting fraudulent traffic in a telecommunications system, the method comprising:
   monitoring, by one or more processors, traffic to or from a user in the telecommunications system;
   determining, by the one or more processors, whether the monitored traffic comprises fraudulent traffic by applying a fraud profile associated with the user to the monitored traffic, wherein the fraud profile comprises rules for monitoring the user for fraudulent traffic and/or detecting fraudulent traffic to or from the user;
   transmitting, by a transmitter, data notifying whether the monitored traffic comprises traffic determined to be fraudulent traffic, the data comprising an indication of a probability that the monitored traffic comprises fraudulent traffic;
   receiving, by a receiver, data identifying an updated fraud profile associated with the user, wherein the updated fraud profile comprises updated rules for monitoring the user based on the indication of the probability that the monitored traffic comprises fraudulent traffic for fraudulent traffic and/or detecting fraudulent traffic to or from the user; and
   applying, by the one or more processors, the identified updated fraud profile to detect further fraudulent traffic transmitted to or from the user.

8. A non-transitory computer readable medium comprising computer readable code configured, when read and executed by a computer, to carry out the method according to claim 7.

9. A profiling network node for determining a fraud profile associated with a user of a telecommunications system, the profiling network node comprising:
   a receiver configured to receive data notifying whether monitored traffic transmitted to or from a user in the telecommunications system is determined to comprise fraudulent traffic, the data comprising an indication of a probability that the monitored traffic comprises fraudulent traffic;
   one or more processors configured to determine a fraud profile associated with the user based at least on the received data, wherein the fraud profile is for use detecting further fraudulent traffic and the fraud profile comprises updated rules for monitoring the user based on the indication of the probability that the monitored traffic comprises fraudulent traffic for fraudulent traffic and/or detecting fraudulent traffic to or from the user; and
   a transmitter configured to in response to the notification that the user has logged onto the telecommunications system, transmit a request for data identifying the fraud profile associated with the user to a subscription profile repository;
   wherein:
   the receiver is further configured to receive the data identifying the fraud profile from the subscription profile repository; and
   the transmitter is further configured to transmit the data identifying the fraud profile to a monitoring network node.

10. A profiling network node according to claim 9, wherein the one or more processors are further configured to determine the fraud profile based on a previous fraud profile.

11. A profiling network node according to claim 9, wherein the transmitter is configured to transmit data identifying the fraud profile to a subscription profile repository for storage.

12. A profiling network node according to claim 9, further configured to undertake the function of a PCRF.

13. A method for determining a fraud profile for a user of a telecommunications system, the method comprising:
receiving, by a receiver, data notifying whether monitored traffic transmitted to or from a user in the telecommunications system is determined to comprise fraudulent traffic, the data comprising an indication of a probability that the monitored traffic comprises fraudulent traffic;
determining, by one or more processors, a fraud profile associated with the user based at least on the received data, wherein the fraud profile is for use detecting further fraudulent traffic and the fraud profile comprises updated rules for monitoring the user based on the indication of the probability that the monitored traffic comprises fraudulent traffic for fraudulent traffic and/or detecting fraudulent traffic to or from the user;
transmitting, in response to the notification that the user has logged onto the telecommunications system, a request for data identifying the fraud profile associated with the user to a subscription profile repository by a transmitter;
receiving, by a receiver, the data identifying the fraud profile from the subscription profile repository; and
transmitting the data identifying the fraud profile to a monitoring network node.

14. A non-transitory computer readable medium comprising computer readable code configured, when read and executed by a computer, to carry out the method according to claim 13.

15. A telecommunications system for detecting fraudulent traffic, the system comprising:
a monitoring network node comprising one or more processors configured to monitor traffic transmitted to or from a user in the telecommunications system;
the one or more processors configured to apply to the monitored traffic a fraud profile associated with the user to determine whether the monitored traffic comprises fraudulent traffic, wherein the fraud profile comprises rules for monitoring the user for fraudulent traffic and/or detecting fraudulent traffic to or from the user;
a transmitter configured to transmit data to a receiver of a profiling network node notifying whether the monitored traffic comprises fraudulent traffic, the data comprising an indication of a probability that the monitored traffic comprises fraudulent traffic;
wherein the one or more processors are further configured to determine an updated fraud profile associated with the user based at least on the received data, wherein the updated fraud profile comprises updated rules for monitoring the user based on the indication of the probability that the monitored traffic comprises fraudulent traffic for fraudulent traffic and/or detecting fraudulent traffic to or from the user; and
a transmitter configured to transmit data identifying the updated fraud profile to one or both of a receiver of a subscription profile repository and a receiver of the monitoring network node.

16. A telecommunications system according to claim 15, wherein the data identifying the updated fraud profile is transmitted to the subscription profile repository, and wherein the subscription profile repository further comprises a fraud profile data recorder configured to store the received data identifying the updated fraud profile in a memory.

17. A telecommunications system according to claim 15, wherein the receiver of the profiling network node is configured to receive notification from the network monitoring node that a user has logged on to the telecommunications system, and wherein the transmitter of the profiling network node is configured to transmit the data identifying the updated fraud profile associated with the monitoring network node.

18. A telecommunications system according to claim 16, wherein the transmitter of the profiling network node is further configured to transmit a request for data identifying the updated fraud profile associated with the user to the receiver of the subscription profile repository,
wherein the profile data recorder is configured to retrieve the data identifying the updated fraud profile from the memory, the subscription profile repository further comprising a transmitter configured to transmit the retrieved data identifying the updated fraud profile to the receiver of the profiling network node.

19. A method for operating a telecommunications system, the method comprising:
monitoring, by one or more processors of a monitoring network node, traffic transmitted to or from a user in the telecommunications system;
applying, by the one or more processors of the monitoring network node, a fraud profile associated with the user to the monitored traffic to determine whether the monitored traffic comprises fraudulent traffic, wherein the fraud profile comprises rules for monitoring the user for fraudulent traffic and/or detecting fraudulent traffic to or from the user;
transmitting, by a transmitter of the monitoring network node, data to a receiver of a profiling network node notifying whether the monitored traffic comprises fraudulent traffic, the data comprising an indication of a probability that the monitored traffic comprises fraudulent traffic;
determining, by the one or more processors of the profiling network node, an updated fraud profile associated with the user based at least on the received data, wherein the updated fraud profile comprises updated rules for monitoring the user based on the indication of the probability that the monitored traffic comprises fraudulent traffic for fraudulent traffic and/or detecting fraudulent traffic to or from the user;
transmitting, by a transmitter of the profiling network node, the data identifying the updated fraud profile to one or both of a receiver of a subscription profile repository and a receiver of the monitoring network node.

20. A non-transitory computer readable medium comprising computer readable code configured, when read and executed by a computer, to carry out the method according to claim 19.

* * * * *